United States Patent
Cheng et al.

(10) Patent No.: US 7,365,970 B2
(45) Date of Patent: Apr. 29, 2008

(54) BEZEL MOUNTING ASSEMBLY

(75) Inventors: Cheng-Lung Cheng, Tu-cheng (TW); Ying-Tong Yang, Shenzhen (CN); Shu-Gang Shi, Shenzhen (CN); Zhe Zhang, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 426 days.

(21) Appl. No.: 11/070,790

(22) Filed: Mar. 2, 2005

(65) Prior Publication Data

US 2005/0213296 A1 Sep. 29, 2005

(30) Foreign Application Priority Data

Mar. 25, 2004 (CN) .................. 2004 2 0044133 U

(51) Int. Cl.
*H05K 5/00* (2006.01)
*H05K 7/00* (2006.01)
*A47B 97/00* (2006.01)

(52) U.S. Cl. .................. 361/683; 361/684; 361/685; 361/686; 312/223.2; 312/223.3

(58) Field of Classification Search ................ 361/683, 361/727, 684, 685, 686; 454/184; 439/157; 312/223.1, 223.2, 331
See application file for complete search history.

(56) References Cited

U.S. PATENT DOCUMENTS

| | | | |
|---|---|---|---|
| 6,445,579 B1* | 9/2002 | Singleton, Jr. .............. | 361/686 |
| 6,614,651 B2* | 9/2003 | Chi et al. .................. | 361/683 |
| 7,042,721 B2* | 5/2006 | Olesiewicz et al. ......... | 361/695 |
| 7,055,160 B1* | 5/2006 | Tan et al. ................... | 720/647 |
| 2004/0047679 A1* | 3/2004 | Launchner et al. ......... | 403/329 |
| 2004/0228083 A1* | 11/2004 | Wang et al. ................ | 361/683 |
| 2005/0017614 A1* | 1/2005 | Cirocco et al. ............. | 312/333 |
| 2005/0063156 A1* | 3/2005 | Olesiewicz et al. ......... | 361/695 |

FOREIGN PATENT DOCUMENTS

TW 566806 12/2003

* cited by examiner

*Primary Examiner*—Lisa Lea-Edmonds
*Assistant Examiner*—Anthony M Haughton
(74) *Attorney, Agent, or Firm*—Morris Manning Martin LLP; Tim Tingkang Xia, Esq.

(57) ABSTRACT

A bezel mounting assembly for rotating and then retaining a bezel (200) to a bracket (400) of a servo includes a bezel, a pair of fastening devices (20) mounted on the bracket of the servo, a pair of sliding devices (40) sliding in the fastening devices, and a pair of rotating devices (50) rotataly attached to the sliding devices. The bezel includes a fixing portion (220) extending therefrom, with an axle hole (222) defined therein. The fastening device includes a pivot hole (442) defined in two sides thereof. The rotating device includes a first axle (542) and a second axle (562). The first axle rotates around the axle hole of the bezel and the second axle rotates around the pivot hole of the sliding device so that the bezel is rotated and kept vertical with horizon.

14 Claims, 7 Drawing Sheets

BEZEL MOUNTING ASSEMBLY

BACKGROUND OF THE INVENTION

1. Field of the Invention

The present invention relates to a mounting assembly, and particularly to a bezel mounting assembly which moves and then retains a bezel to a predetermined position of a bracket of a servo.

2. Prior Art

To expand a servo's functions and capabilities, it is necessary to add additional hardware and components, such as hard drives, motherboards, and etc. To make the expanding process easy, expansion brackets are designed for accommodating the desired hardware or components. In enclosure design, the expansion brackets are movably installed in the servo chassis and can be withdrawn from the servo chassis conveniently. The expansion brackets are commonly installed in the servo chassis through rail devices. Each expansion bracket has a bezel, which is generally attached to the rail device and assembled together with the expansion bracket. The hardware and components mounted in the expansion brackets normally includes multiple ports and interfaces. However, the rail device allows only one directional movement, and unable to rotate. Thus, it is inconvenient if the bezel assembled together with the expansion brackets is provided with only one directional movement, and not rotation.

Thus a bezel rotating method is utilized to allow the bezel to rotate if it is drawn out a predetermined distance from the expansion bracket. One of a typical bezel rotating apparatus is disclosed in Taiwan Patent Publication No. 566806. The bezel rotating apparatus of the mentioned patent includes a fixing board, a sliding board, and a rotating board. The rotating board is secured to a sidewall of the bezel by screws. When the sliding board slides forwardly, the rotating board is pulled and causes the bezel to move forward so that the bezel is disengaged from the servo. When the rotating board rotates downwardly, the bezel is rotated downwardly.

However, during the operating of the bezel rotating apparatus, the rotating of the bezel is unable to maintain horizontal level. Moreover, the bezel rotating apparatus is fixed to the bezel by screws, which is inconvenient and time-consuming. Thus, it is necessary to refine the bezel rotating means and eliminate the above-mentioned drawbacks.

SUMMARY OF THE INVENTION

Accordingly, an object of the present invention is to provide a bezel mounting assembly with a convenient and liable usability, which moves and then retains the bezel to a predetermined position of a bracket of a servo.

To achieve the above-mentioned object, a bezel mounting assembly of the present invention includes a bezel, a pair of fastening devices mounted on the bracket of the servo, a pair of sliding devices sliding in the fastening devices, and a pair of rotating devices rotataly attached to the sliding devices.

The bezel includes a bottom panel, and a fixing portion extending from at least one end of the bottom panel, with an axle hole defined therein. The fastening device includes a pivot hole defined in two sides thereof. The rotating device includes a bottom wall and a first arm extending from two sides thereof, and a second arm extending outwardly from the first arm, and a first axle and a second axle are defined in the first arm and the second arm respectively. The first axle rotates around the axle hole of the bezel and the second axle rotates around the pivot hole of the sliding device so that the bezel is rotated and kept vertical with horizon.

Other objects, advantages and novel features of the present invention will be drawn from the following detailed description of preferred embodiments of the present invention with the attached drawings, in which:

DETAILED DESCRIPTION OF THE INVENTION

Figure 1:
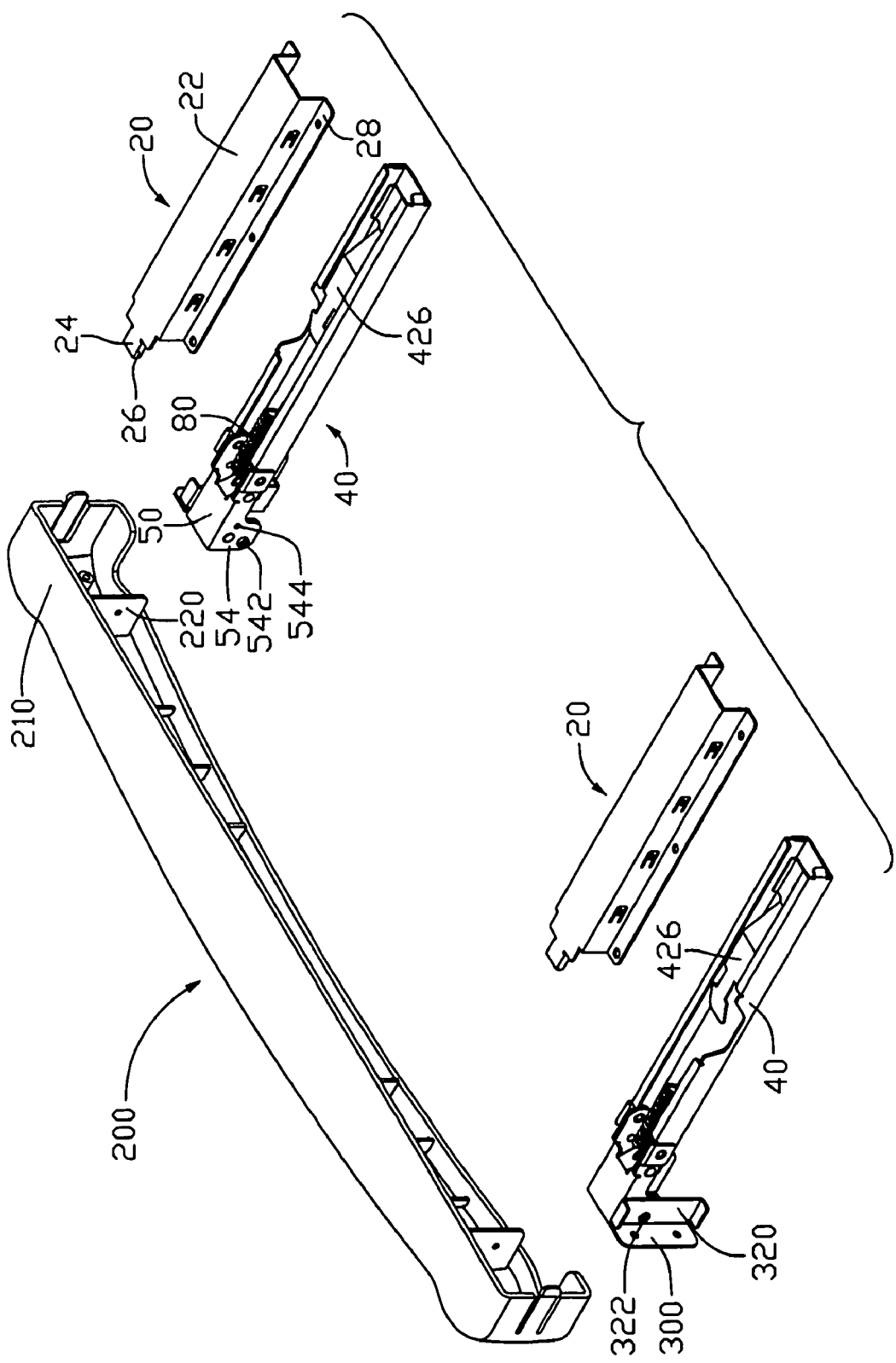
FIG. 1 is an exploded, isometric view of a bezel mounting assembly in accordance with the present invention, the bezel mounting assembly comprising a bezel, a pair of fastening devices, a pair of sliding devices, a pair of rotating devices, a pair of springs and a pair of fastener.

Referring to FIG. 1, a bezel mounting assembly of an electronic device like a servo in accordance with the present invention for retaining a bezel on a servo chassis comprises a bezel 200, a pair of fastening devices 20, a pair of sliding devices 40, a pair of rotating devices 50, a pair of springs 80 and a pair of symmetrical fasteners 300. The bezel 200 is moved after the bezel 200 being drawn out, and then is retained in a predetermined position.

Each fastening device 20 comprises a bottom plate 22. Two side plates 28 extend vertically down from the two opposite edges of the bottom plate 22 and then bend horizontal outwardly respectively. A protruding plate 24 extends from a distal end of the bottom plate 22, with a salient 26 extending from each side thereof.

Figure 2:
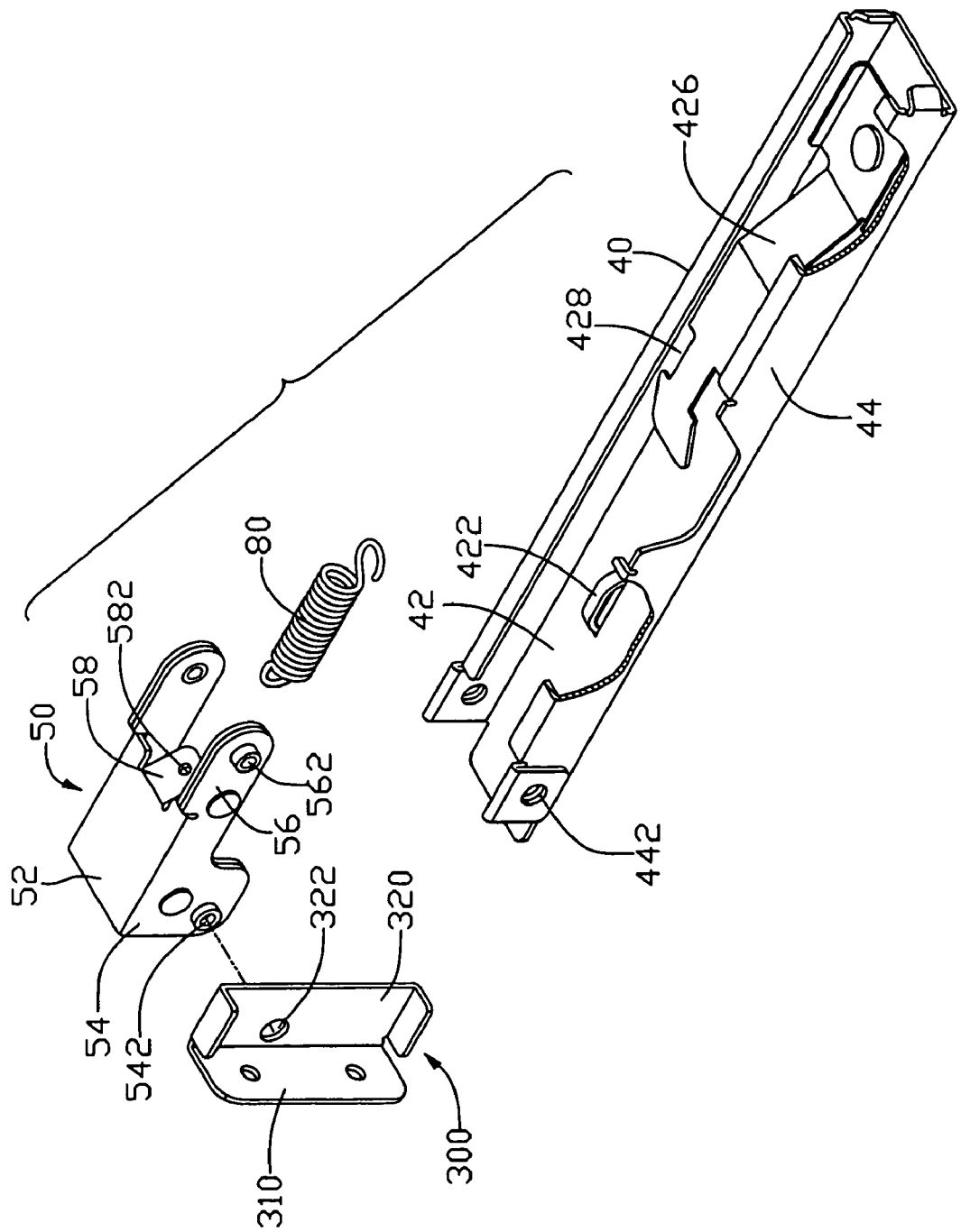
FIG. 2 is an isometric view of one of the sliding devices, rotating devices, fasteners and springs of FIG. 1.

Referring also to FIG. 2, each sliding device 40 accommodated in the fastening device 20 comprises a bottom wall 42. A catch 422 and a resilient strip 426 are formed on the bottom wall 42 in alignment. A locking portion 428 is recessed from a vicinity of a distal end of the resilient strip 426 for engaging with the salient 26 of the fastening device 20. In this embodiment of the present invention, the resilient strip 426 is a separate element attached to the bottom wall 42 by screws or rivets. A side wall 44 extends upwardly from each side of the bottom wall 42, with a pivot hole 442 defined in an end thereof.

Each rotating device 50 comprises a bottom wall 52. A first arm 54 extends downwardly from each of two opposite sides of the bottom wall 52, with a first axle 542 defined therein. A knob 544 is formed on the inside first arm 54. A second arm 56 extends from a junction of each first arm 54 and the bottom wall 52. A second axle 562 is formed on each second arm 56 for engaging into a corresponding pivot hole 442 of the sliding device 40. A latch plate 58 is bent downwardly from another side of the bottom wall 52, with a latch hole 582 defined therein.

Each fastener 300 comprises a bottom plate 310. A side plate 320 extending from an edge of the bottom plate 310, with a rotating hole 322 defined therein.

Figure 3:
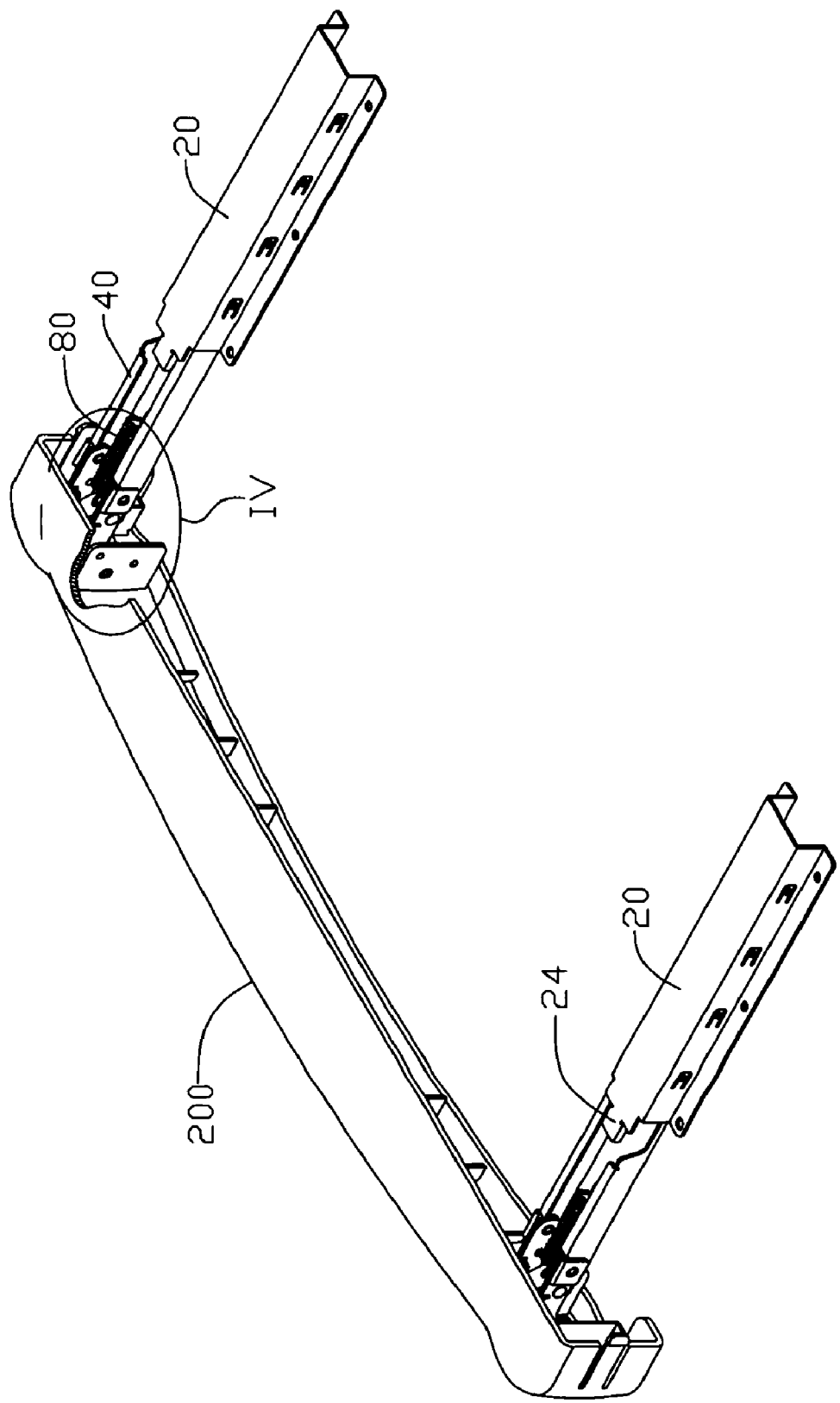
FIG. 3 is an assembled view of FIG. 1.
Figure 4:
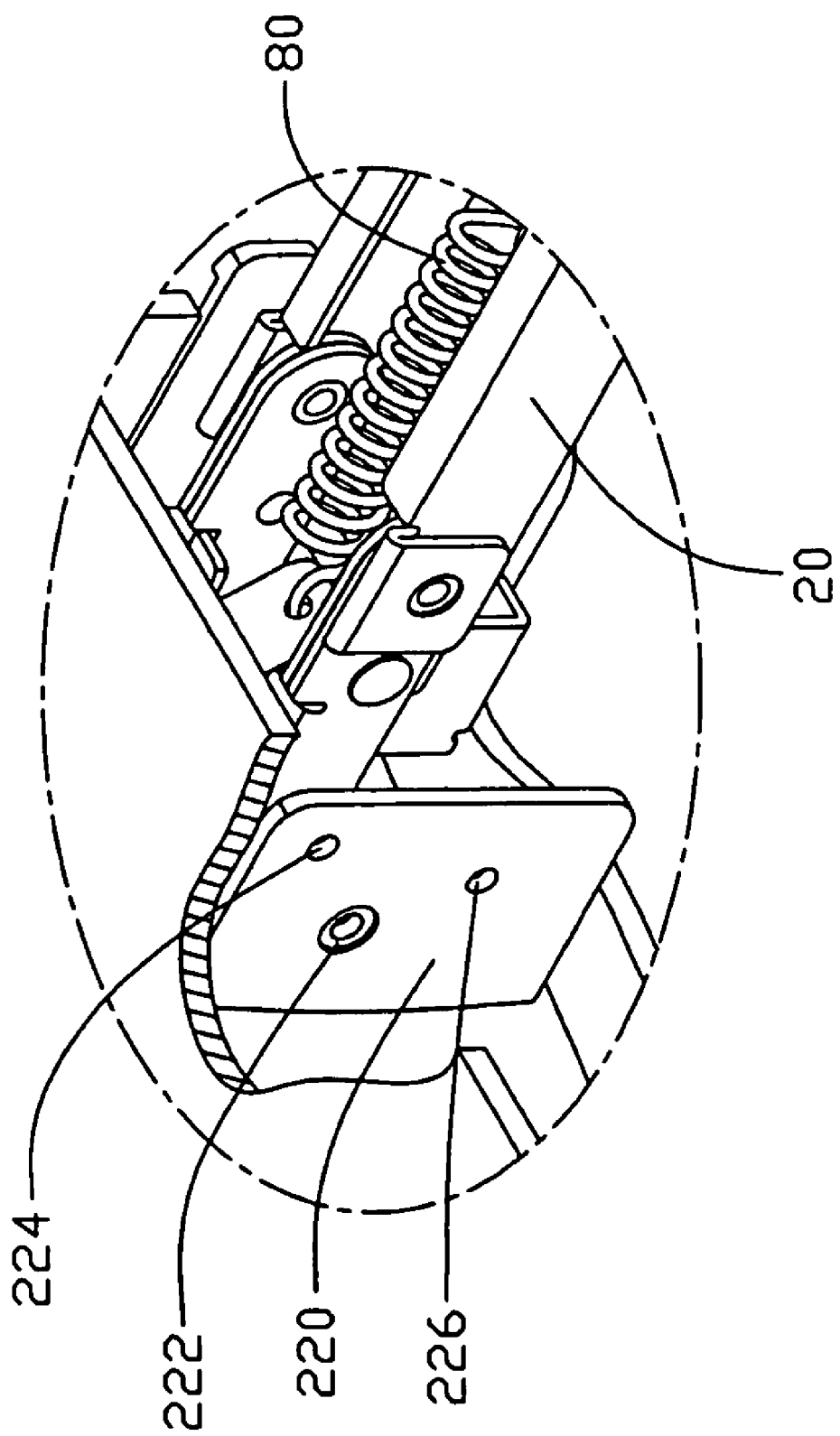
FIG. 4 is an enlarged view of a circled portion IV of FIG. 3.

Referring also to FIGS. 3 and 4, the bezel 200 comprises a bottom panel 210. A fixing portion 220 extends outwardly from each end of an inner side of the bottom panel 210, with an axle hole 222, a first anchor hole 224 and a second anchor hole 226 defined therein.

In assembly, firstly, the first axle 542 of one of the first arms 54 of the rotating device 50 passes through the axle hole 222 of the corresponding fixing portion 220 of the bezel 200. The second axles 562 of the second arms 56 pass through the corresponding pivot holes 442 of the sliding device 40. The another first axle 542 passes through the rotating hole 322 of the corresponding fastener 300, then the bottom plate 310 of each fastener 300 is attached to the bezel 200. Thus the bezel 200 is rotatably attached to the sliding device 40 via the rotating device 50 and pivots upon the first axles 542 and the second axles 562. Then an end of each spring 80 is engaged with the latch hole 582 of each rotating device 50, and the other end of each spring 80 is engaged with the catch 422 of the sliding device 40.

Figure 5:
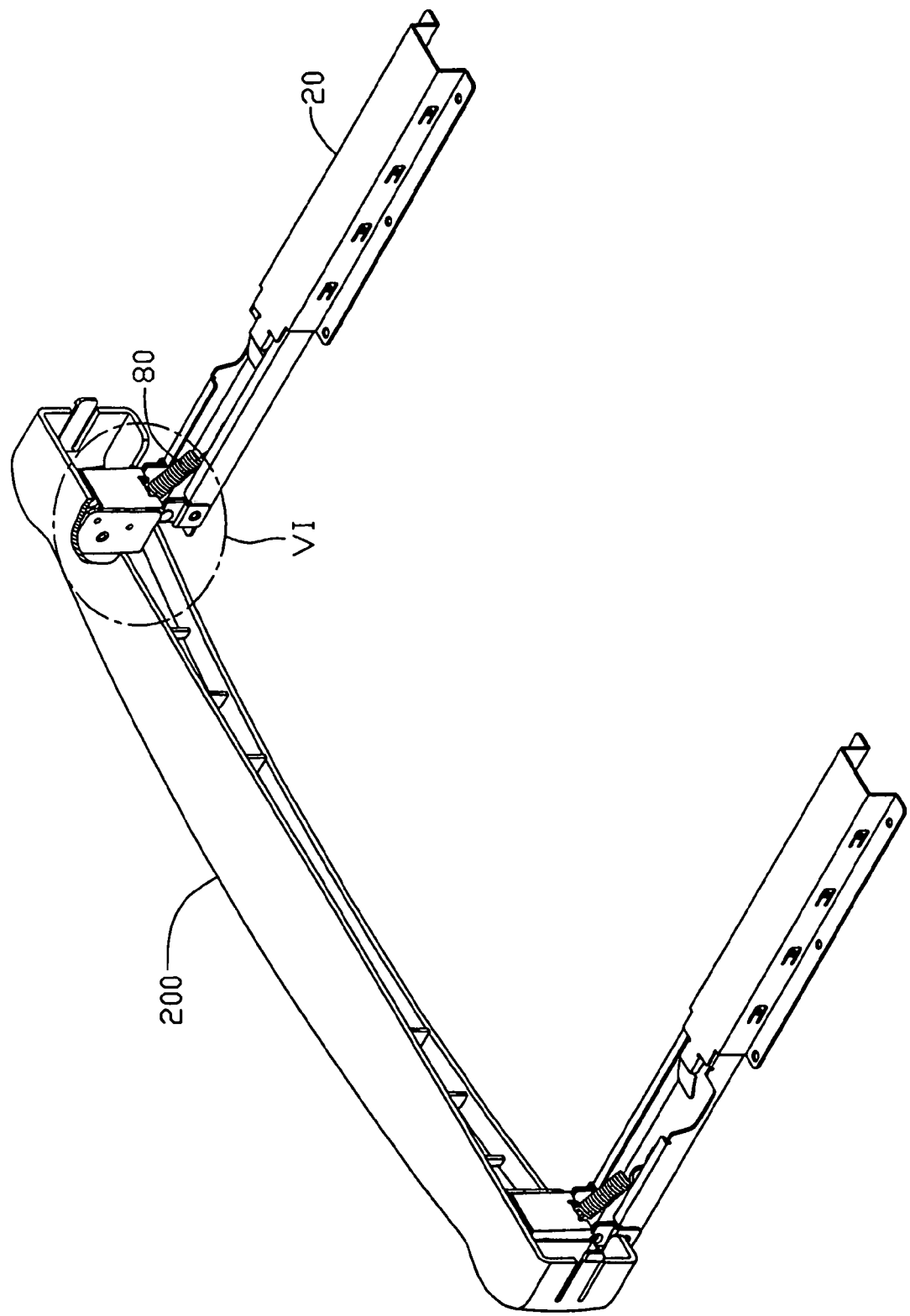
FIG. 5 is an assembled view of FIG. 1, and showing the bezel in a drawn out and rotated state.
Figure 6:
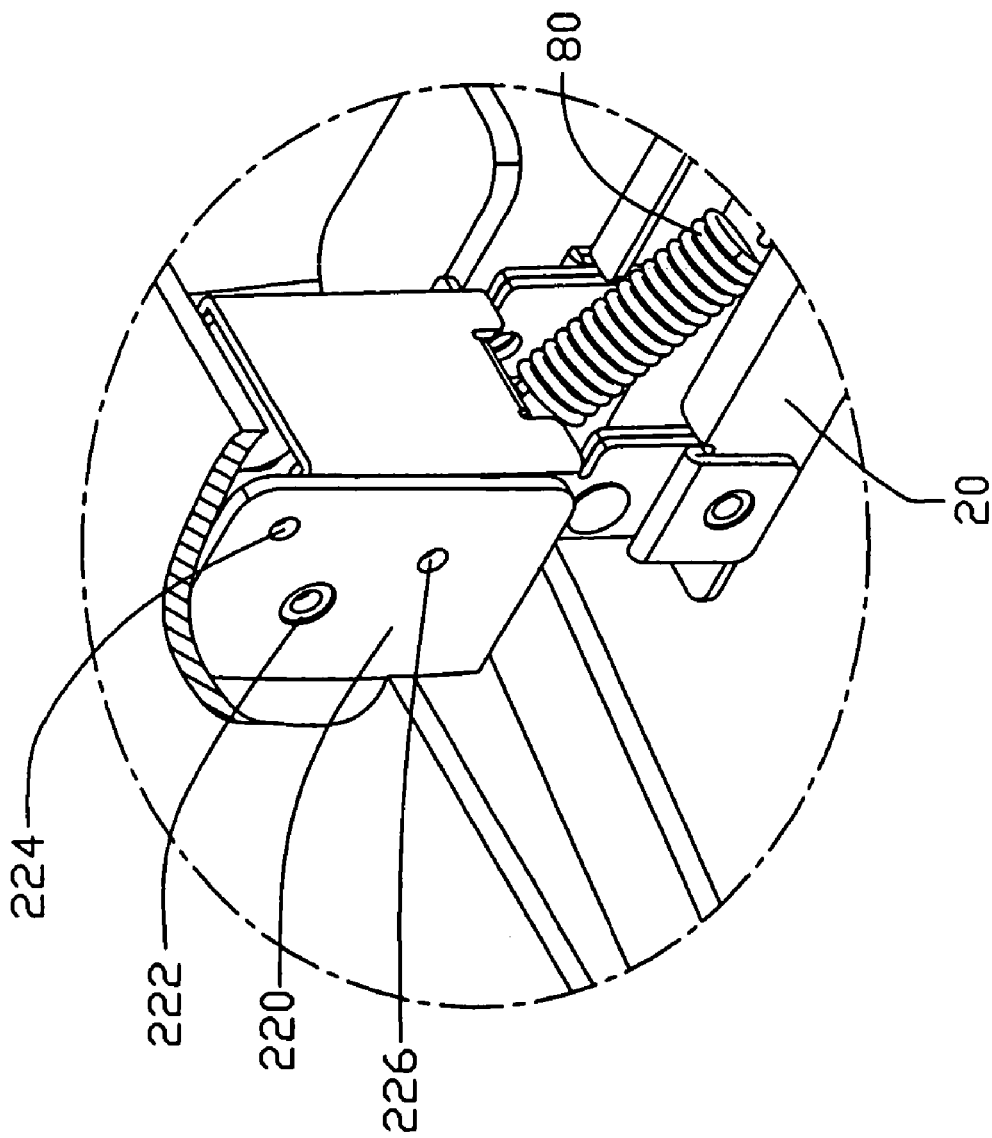
FIG. 6 is an enlarged view of a circled portion VI of FIG. 5.
Figure 7:
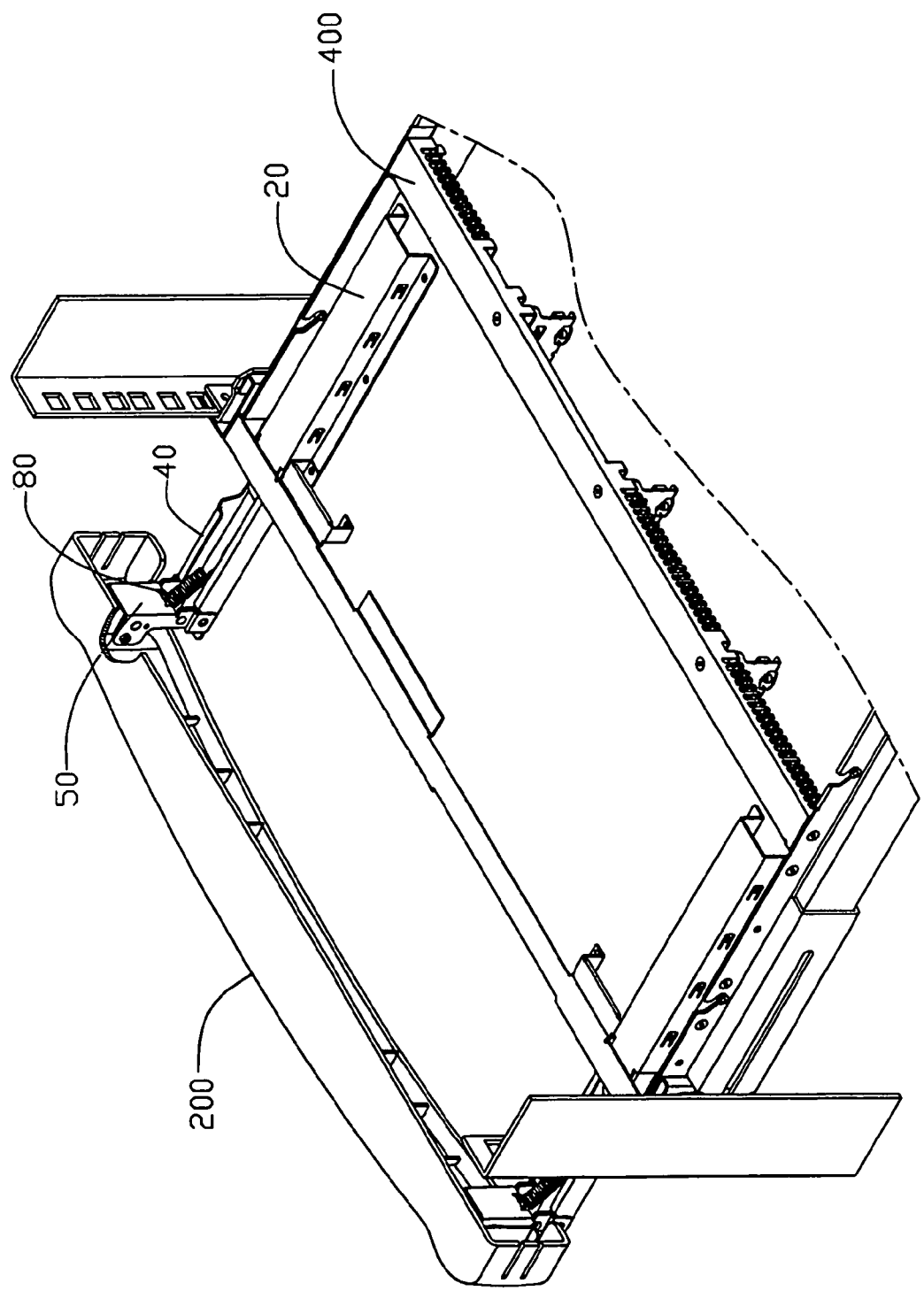
FIG. 7 is similar to FIG. 5, but showing the bezel mounting assembly mounted on a bracket of a servo.

Referring also to FIGS. 5-7, a servo (partly shown) has a bracket 400 mounted therein to enclose some components of the servo. The fastening device 20 is attached to the bracket 400. Then each sliding device 40 is slid into the corresponding fastening device 20. Thus the bezel mounting assembly is mounted on the bracket 400.

When the bezel 200 is drawn out from the bracket 400 of the servo for a predetermined distance, the locking portion 428 of the resilient strip 426 of the sliding device 40 are snappingly engaged into the salient 26 of the fastening device 20 by resilience generated by the resilient strip 426 so that the bezel 200 is prevented from being drawn overly. At the time, the bezel 200 is still steady, with the knob 544 of the rotating device 50 accommodated in the first anchor hole 224 of the fixing portion 220.

When the bezel 200 is pulled upwardly, the rotating device 50 is rotated around the second axle 562 thereof and the bezel 200 is rotated around the first axle 542 of the rotating device 50. Thus the bezel 200 is kept vertical to a with horizon plane. The knob 544 of the rotating device 50 is moved from the first anchor hole 224 to the second anchor hole 226 of the fastening device 200, and finally engaged into the second anchor hole 22. Thus the bezel 200 is secured to a predetermined position relative to the servo. At the time, the springs 80 are retracted and abut against the rotating device 50 for retaining the bezel 200 at the predetermined position.

When the bezel 200 is pulled downwardly, the bezel 200 is rotated back and returns to the same horizontal height with the sliding device 40, then the resilient strip 426 is pressed downwardly. At the time the bezel 200 is pushed inwardly, thus the bezel 200 is returned to the original position.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A bezel mounting assembly for a bracket of a servo, comprising:
   a bezel comprising a fixing portion formed therefrom;
   at least one fastening device adapted to be mounted on the bracket of the servo;
   at least one sliding device sliding in the fastening device; and
   at least one rotating device having one end pivotally attached to the sliding device, and the other end pivotally attached to the fixing portion of the bezel; wherein the rotating device rotates around the sliding device and the bezel rotates around the rotating device so that the bezel is capable of keeping vertical to the horizontal in moving between its open and closed positions wherein the rotating device comprises a first arm and a second arm extending outwardly from the first arm, and a first axle and a second axle formed on the first arm and the second arm respectively, wherein the first arm further comprises a knob, and the fixing portion defines a first anchor hole and a second anchor hole, the knob is engaged into the first anchor hole when the bezel is in original position, and the knob moves into the second anchor hole for retaining the bezel when the bezel is rotated.

2. The bezel mounting assembly as claimed in claim 1, wherein an axle hole corresponding to the first axle is defined in the fixing portion of the bezel, and a pivot hole corresponding to the second axle is defined on one side of the sliding device.

3. The bezel mounting assembly as claimed in claim 1, wherein a protruding plate extends from an end of the fastening device, with a salient extending from each side thereof.

4. The bezel mounting assembly as claimed in claim 3, wherein a resilient member is formed from the sliding device, with a locking portion recessed therefrom for engaging with the salient.

5. The bezel mounting assembly as claimed in claim 1, wherein the bezel mounting assembly further comprises a spring for connecting the sliding device and the rotating device.

6. The bezel mounting assembly as claimed in claim 1, wherein the bezel mounting assembly further comprises a fastener formed on the bezel for rotating around the rotating device.

7. An electronic device, comprising:
   a bracket disposed in said electronic device to enclose components of said electronic device, said bracket having at least one fastening device installed therein;
   at least one sliding device slidably engagable with said at least one fastening device, one end of said at least one sliding device extendable out of said bracket in case that said at least one sliding device slidably moves relative to said fastening device;
   at least one rotating device rotatably attached to said one end of said at least one sliding device and movable out of said bracket together with said one end of said at least one sliding device; and
   a bezel attached to said at least one rotating device and movable with said at least one rotating device, said bezel located beside said bracket for covering said bracket in case that said at least one rotating device is in said bracket, and movable aside to expose said bracket in case that said at least one rotating device is out of said bracket, and a facing direction of said bezel located beside said bracket being same as a facing direction of said bezel moved aside for exposure of said bracket wherein said at least one rotating device comprises a bottom wall, a first arm extends from two opposite sides of said bottom wall and a first axle is formed thereon, wherein a second arm extends outwardly from said first arm of said at least one rotating device, and a second axle formed thereon, wherein said bezel comprises a fixing portion, and an axle hole is defined on said fixing portion for engaging with and rotating around said first axle of said at least one rotating device, wherein said first arm of said at least one rotating device further comprises a knob, and said fixing portion of said bezel has a first anchor hole and a second anchor hole, said knob is engaged with said first anchor hole when said bezel is located beside said bracket, and is engaged with said second anchor hole for retaining said bezel when said bezel is moved aside to expose said bracket.

8. The electronic device as claimed in claim 7, wherein said at least one fastening device has a salient extending therefrom and said at least one sliding device has a resilient member extending therefrom with a locking portion, and engagement of said locking portion and said salient prevents said at least one sliding device from being drawn overly.

9. The electronic device as claimed in claim 7, wherein said at least one sliding device comprises a pivot hole defined therein for engaging with said second axle of said at least one rotating device.

10. The electronic device as claimed in claim 7, further comprises a spring connected between said at least one sliding device and said at least one rotating device.

11. The electronic device as claimed in claim 10, wherein said at least one sliding device comprises a catch, and a latch plate with a latch hole is bent from said at least one rotating device, said spring is engaged between said catch and said latch hole.

12. The electronic device as claimed in claim 7, further comprises a fastener in said bezel, and said fastener comprising a rotating hole for rotatably mounting around said first axle of said at least one rotating device.

13. A bezel mounting assembly for movably connecting a bezel to an electronic device, the bezel mounting assembly comprising:

a rotating device having one end rotatably connected to the bezel, and the other end rotatably connected to the electronic device, a knob protruding from the rotating device; and a fastening portion disposed at the bezel, two anchor holes being defined in the fastening portion;

wherein the bezel is movable between two positions to rotate the rotating device so that the knob of the rotating device is selectively engaged in the anchor holes of the fastening portion, the bezel is vertical to the horizontal in said two positions.

14. The bezel mounting assembly as claimed in claim 13, wherein said two positions comprises a closed position in which the bezel covers the electronic device, and an exposed position in which the bezel exposes the electronic device.

* * * * *